(12) United States Patent
Thakur

(10) Patent No.: US 7,532,755 B2
(45) Date of Patent: May 12, 2009

(54) IMAGE CLASSIFICATION USING CONCENTRATION RATIO

(75) Inventor: Khageshwar Thakur, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 826 days.

(21) Appl. No.: 10/763,129

(22) Filed: Jan. 22, 2004

(65) Prior Publication Data

US 2005/0163385 A1 Jul. 28, 2005

(51) Int. Cl.
*G06K 9/00* (2006.01)
(52) U.S. Cl. .................................. 382/170; 382/224
(58) Field of Classification Search ................ 382/170
See application file for complete search history.

(56) References Cited

U.S. PATENT DOCUMENTS

| | | | |
|---|---|---|---|
| 4,411,015 A * | 10/1983 | Scherl et al. ................ 382/171 |
| 5,107,529 A | 4/1992 | Boone | |
| 5,164,993 A | 11/1992 | Capozzi et al. | |
| 5,224,176 A | 6/1993 | Crain | |
| 5,390,259 A | 2/1995 | Withgott et al. | |
| 5,642,431 A * | 6/1997 | Poggio et al. ................ 382/118 |
| 5,686,960 A | 11/1997 | Sussman et al. | |
| 5,756,981 A | 5/1998 | Roustaei et al. | |
| 5,790,690 A * | 8/1998 | Doi et al. .................... 382/128 |
| 5,859,710 A | 1/1999 | Hannah | |
| 5,883,973 A * | 3/1999 | Pascovici et al. ............ 382/176 |
| 5,982,934 A | 11/1999 | Villalba | |
| 6,061,091 A | 5/2000 | Van de Poel et al. | |
| 6,078,686 A | 6/2000 | Kim | |
| 6,092,059 A * | 7/2000 | Straforini et al. .............. 706/14 |
| 6,163,621 A | 12/2000 | Paik et al. | |
| 6,192,360 B1 * | 2/2001 | Dumais et al. ................ 707/6 |
| 6,317,192 B1 | 11/2001 | Silverbrook et al. | |
| 6,370,279 B1 | 4/2002 | Paik | |
| 6,476,863 B1 | 11/2002 | Silverbrook | |
| 6,558,324 B1 | 5/2003 | Von Behren et al. | |
| 6,618,117 B2 | 9/2003 | Silverbrook | |
| 6,650,779 B2 | 11/2003 | Vachtesvanos et al. | |
| 7,023,582 B2 | 4/2006 | Sawada et al. | |
| 2001/0007599 A1 * | 7/2001 | Iguchi et al. ................ 382/274 |
| 2001/0036314 A1 * | 11/2001 | Yamaguchi et al. ......... 382/172 |

(Continued)

OTHER PUBLICATIONS

Stephen M. Pizer, John B. Zimmerman, Edward V. Staab, "Adaptive Grey Level Assignment in CT Scan Display," Journal of Computer Assisted Tomography, University of North Carolina, vol. 8 (No. 2), p. 300-305, (Jan. 22, 1984).

(Continued)

*Primary Examiner*—Vikkram Bali
*Assistant Examiner*—David P Rashid
(74) *Attorney, Agent, or Firm*—Taylor & Aust, PC

(57) ABSTRACT

Methods and systems of classifying an image by use of a concentration ratio that indicates the smoothness of the distribution of a population of elements in the image or portions thereof. Alternate embodiments may include determining the concentration ratio based on luminance components, grayscale components or a histogram, use of thresholds for determing the image classifications such as text, graphic or photographic, and use of a training process for creating the thresholds that includes analyzing a set of images having known classifications.

6 Claims, 11 Drawing Sheets
(2 of 11 Drawing Sheet(s) Filed in Color)

U.S. PATENT DOCUMENTS

| | | |
|---|---|---|
| 2002/0039436 A1 | 4/2002 | Alumot et al. |
| 2002/0067857 A1* | 6/2002 | Hartmann et al. ........... 382/224 |
| 2003/0021488 A1 | 1/2003 | Shaw et al. |
| 2003/0086515 A1 | 5/2003 | Trans et al. |
| 2003/0086608 A1 | 5/2003 | Frost et al. |
| 2003/0095206 A1 | 5/2003 | Wredenhagen et al. |
| 2003/0153823 A1 | 8/2003 | Geiser et al. |
| 2004/0119233 A1 | 6/2004 | Charpentier |

OTHER PUBLICATIONS

Pizer et al., "Adaptive Histogram Equalization and Its Variations," Computer Vision, Graphics and Image Processing, Academic Press, p. 355-368, (Jan. 22, 1987).

Dr. Majid Rabbani, "Advanced Image Processing," IS&T/SPIE's 15th Annual Symposium, Eastman Kodak Company (Santa Clara, CA).

* cited by examiner

IMAGE CLASSIFICATION USING CONCENTRATION RATIO

CROSS REFERENCES TO RELATED APPLICATIONS

This application is related to U.S. patent application Ser. No. 10/763,128 entitled "CONTROLLED MOVING WINDOW ADAPTIVE HISTOGRAM EQUALIZATION," filed Jan. 22, 2004 and assigned to the assignee of the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to image processing, and more particularly to methods and systems for classifying images.

2. Description of the Related Art

There are a variety of existing image-processing systems and techniques. Some of these existing systems and techniques use histogram equalization to expand the dynamic range and contrast of an image. In a technique known as adaptive histogram equalization ("AHE"), the image is divided into small portions called "tiles," and histogram equalization is applied to each tile by using a look-up table. AHE can improve the contrast of images that are partially overexposed and/or partially underexposed.

In addition to image processing to improve image quality, image classification may also be of interest in various circumstances. For example, in printing or copying, various settings (e.g. halftone mode, color table, etc.) can be selected automatically if the image content or class of an image (e.g., text, graphic, photograph, etc.) is known.

Although AHE is relatively effective in fixing exposure problems in an image, it also introduces unwanted, tiling artifacts. In addition, if AHE is mistakenly applied to a properly exposed image, the process boosts contrast to an undesirable level and the resulting image is worse than the original. Accordingly, there is a need for improved methods and systems for processing images. In addition, although known methods of classifying images are functional, there is a need for improved methods and systems of doing the same.

SUMMARY OF THE INVENTION

In one embodiment of the invention a concentration ratio is used to classify images. In another embodiment, the invention may include a method of processing an image. The method may include obtaining an image; determining one or more classification thresholds; determining the concentration ratio for the image; comparing the concentration ratio to at least one of the one or more classification thresholds; and classifying the image based on the comparison of the concentration ratio to at least one of the one or more classification thresholds. A further embodiment may include generating a histogram of the image to be used in determining the concentration ratio.

In still yet another embodiment, the invention may provide an image classifying processor. The processor may be configured to obtain an image, obtain one or more classification thresholds, determine a concentration ratio for the image, compare the concentration ratio to at least one of the one or more classification thresholds, and classify the image based on the comparison of the concentration ratio to at least one of the one or more classification thresholds. Further embodiments may include a training process using a set of images having predetermined characteristics for determining the classification thresholds. In a yet further embodiment, generating a histogram for each of the images in the set of images and using those histograms to develop concentration ratios for determining the classification threshold.

Other features and advantages of the invention will become apparent to those skilled in the art upon review of the following detailed description, claims, and drawings.

BRIEF DESCRIPTION OF THE DRAWINGS

The patent or application file contains at least one drawing executed in color. Copies of the patent or patent application publication with color drawings(s) will be provided by the Office upon request and payment of the necessary fee.

In the drawings.

Figure 1:
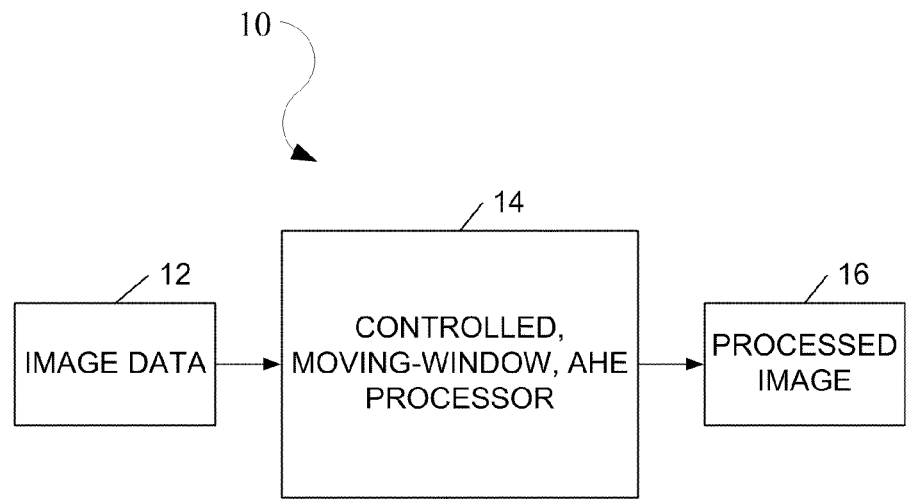
FIG. 1 is an illustration of a controlled, moving-window processor.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Before embodiments of the invention are described in detail a brief review of histogram equalization and moving window AHE is provided.

In ordinary histogram equalization, an attempt is made to make the histogram uniform by redistributing gray or color levels, depending on whether black and white or color images are processed. The following discussion is based on gray scale images with 256 levels (enumerated 0-255). If color images are processed, either each color channel (e.g., red ("R"), green ("G"), and blue ("B")) is treated separately or the luminance channel is used.

For gray scale images, the redistribution performed through histogram equalization, for an input I and producing an output $O_1$, may be described by:

$$\left( \sum_{L=0}^{I} P_L / (N_x * N_y) \right) - 1 \qquad \text{(Equation 1)}$$

$$O_1 = 256x$$

In Equation 1, $N_x$ and $N_y$ are an image width and height in pixels, respectively, and $P_L$ is the population of pixels at a level L. The output value $O_1$ for each input value is stored in a look-up table. The look-up table is used to transform the image.

To reduce artifacts, a moving window technique may be added to histogram equalization. In moving-window AHE the image is divided into tiles, but the look-up table is made using a bigger window. The bigger window is selected in such a way that there is an overlap between windows used for neighboring tiles. This overlap ensures that look-up tables used in neighboring tiles aren't drastically different. This produces a smoother transition over tiles. However, this method still has some deficiencies.

In some embodiments of the invention, a means or mechanism to control the degree of enhancement in AHE is provided. The mechanism may be a control parameter. In one embodiment, a control parameter, C is used and calculations are performed using a modified version of Equation 1. In some embodiments, C can take values from 0 (minimum) to 1 (maximum). A modified output $O_2$ may be given by:

$$O_2 = I + (O_1 - I) * C \qquad \text{(Equation 2)}$$

As one can see by reference to Equation 2, when C is at its minimum (0), the output is the same as the input. When C is at its maximum (1), then Equation 2 reduces to Equation 1. Thus, by changing the control parameter C from 0 to 1 the degree or amount of enhancement can be varied from no-effect to full-effect. In some embodiments, the control parameter C is specified by the user (e.g., is input via a graphical user interface), is determined by the tile characteristics, or both.

The inventors have determined that when tile characteristics control the degree of enhancement (e.g., in contrast) of an image, excessive graininess in the processed image may occur. In general, grainy images are produced when what is called a "smooth" image (i.e., an image with few gray levels) is processed by histogram equalization.

As will be discussed in greater detail, in some embodiments of the invention, when a smooth image or, more specifically, a smooth tile is detected, the amount of equalization or enhancement is reduced. Smoothness of an image or specific tile may be determined using a concentration ratio ("CR"). A CR is a number that indicates how concentrated or widespread the population of elements is, such as, for example, how wide spread the distribution of a histogram is. Generally, if the population is distributed evenly across all levels, the CR is a large number. Likewise, if the entire population is concentrated at a few levels, the CR is generally a small number. In a histogram where $P_L$ is the population at level L, the CR may be described by:

$$CR\left(\sum_L P_L\right)^2 / \left(\sum_L P_L^2\right) = \qquad \text{(Equation 3)}$$

When using Equation 3, the CR for an image or tile is greater than 1. For example, for a tile having a size of 16×16 pixels, the CR ranges from 1 to 16. In embodiments of the invention, the CR may be scaled to range between 0 and 1. Continuing the prior example for a 16×16 tile, the CR can be divided by 16 to make it range between $\frac{1}{16}$ and 1.

The CR (usually after it is scaled) may be used as the control parameter C. Alternatively, the CR may be combined with a parameter (referred to herein as "UI") provided by a user (for example, through a dialog box presented by a graphical user interface on a computer or display panel for a printer or multifunction device) and the combination of the CR and the UI may be used as the control parameter C. In addition, the CR, UI, or both may be modified before they are combined or used as the control parameter C. Modification of the CR, UI, or combination may be performed to balance the dominance of CR and UI in overall control. Modification of the parameters can be accomplished in a variety of ways: e.g., by dividing or multiplying the parameters by a number or by taking the square or cube root, etc. of the parameters.

Regardless of how the control parameter C is ultimately determined, embodiments of the invention use the control parameter C in Equation 2 to generate a look-up table. The look-up table may, in turn, be used to transform the current tile.

Figure 2:
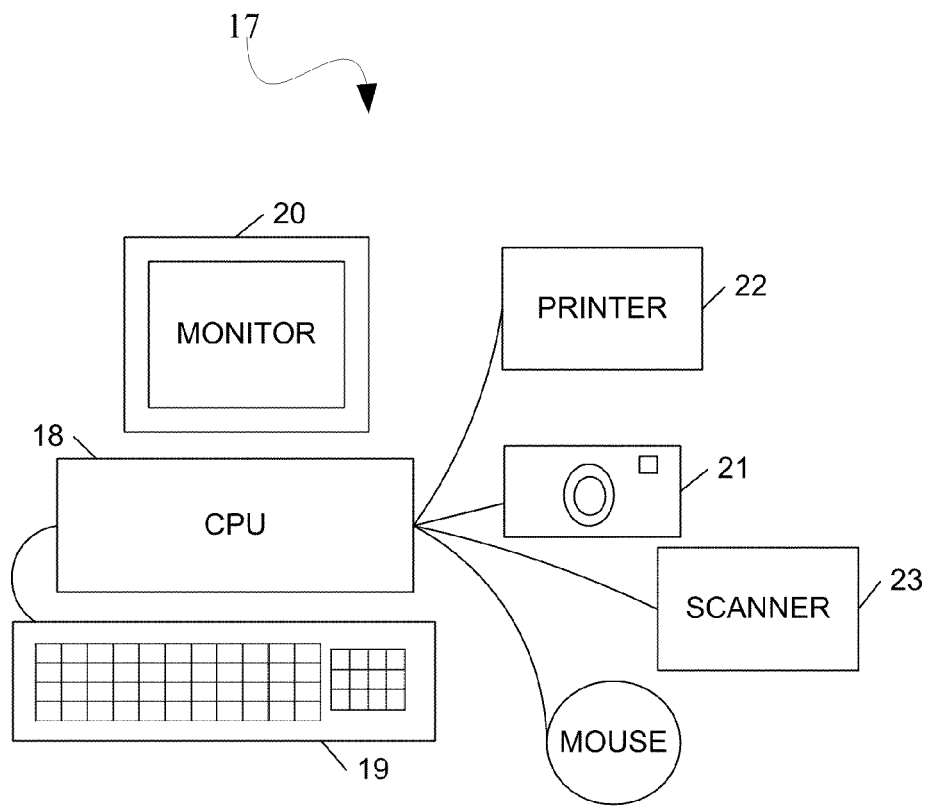
FIG. 2 is an illustration of a computer system that may be used in embodiments of the invention.

FIG. 1 illustrates a processing system 10 where image data 12, which may include an image, is input into an image processor 14. The image processor performs processing as described herein and generates a processed image or processed image data 16. The image processor may be implemented with a variety of hardware and software. For example, a general-purpose, personal computer 17 (FIG. 2) having a central processing unit 18 ("CPU"), solid-state memory (not shown), a disk drive (also not shown), running operating system software (such as Microsoft Windows, also not shown) and input and output devices, such as a keyboard 19, a mouse, and monitor 20, may be programmed in accordance with the teachings herein. Image data from, for example, a digital camera 21 may be downloaded to the computer 17 and processed. The processed image data 16 may be displayed on the monitor 20, printed using a printer 22, or displayed on a display panel incorporated into a printer or multifunction device. Image data may also be provided by a scanner 23.

Software implementing embodiments of the invention may be created as an application program executed under the control of the operating system. Other embodiments could be implemented using application specific integrated circuits, digital signal processing devices, and other hardware.

Figure 3:
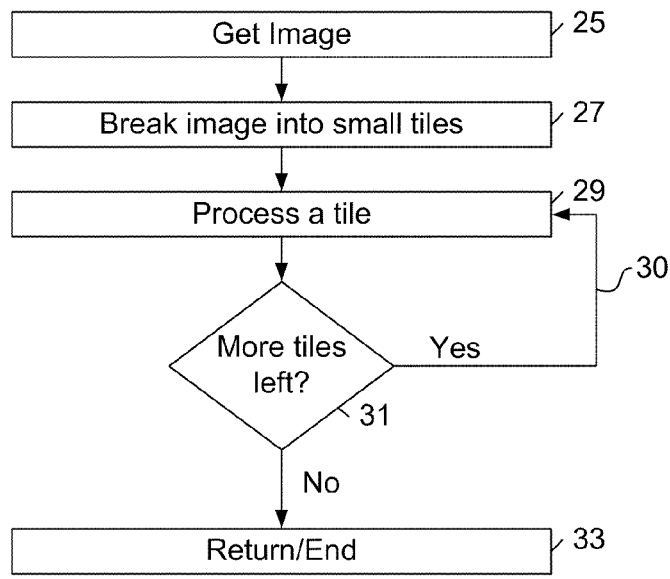
FIG. 3 is a flow chart illustrating image processing.

As shown at step 25 in FIG. 3, the processor 14 retrieves an image either from an image capture device (such as the camera 21 or a scanner) or from memory (e.g., in the CPU or the disk drive) and breaks the image into small tiles at step 27. Techniques for breaking images into tiles are known in the art.

For example, the technique described below may be used in embodiments of the invention.

An exemplary image that might be retrieved in step 25 could have a width of 300 pixels and a height of 200 pixels and, therefore, include a total of 60,000 pixels. Assuming for purposes of this example that the image is also a 256 gray scale image, then each pixel can have a gray value between 0-255. Generally, image data, for example, data in a JPEG file, is available or can be readily converted to a two dimensional array, which in pseudo code could be expressed as an array named "imageData" having a "width" and a "height" as follows: imageData [width][height].

To divide the image into small blocks or tiles, the image may be scanned using programming loops along the width and height with increments in the width and height made in chunks. In an embodiment where tiles or blocks measuring 10 by 10 pixels is implemented, and the images being processed have a width of 300 pixels and a height of 200 pixels, software could be implemented in accordance with the follow code, where the variable x corresponds to a position along the width of the of tile and the variable y corresponds to a position along the height of the tile.

```
For(x=0; x<300; x+= 10)    //Scan the image along width. Increment x
                           //by 10 each time.
{
    For(Y=0; y<200; y+= 10)    //Scan the image along height.
                               //Increment y by 10 each time.
    {
        ProcessCurrentBlock( );    //Call a processing method or
                                   //procedure for whatever processing
                                   //is needed for the current block.
    }
}
```

Each tile in the image is processed as shown at step 29 (for example in the processing method or procedure "ProcessCurrentBlock"). The processing that occurs at step 29 will be described in greater detail below. At step 31, the processor 14 checks to see if all the tiles in the image have been processed. If more tiles need to be processed, step 29 is repeated, as shown by loop 30. If all the tiles have been processed, the procedure ends, as shown at step 33. The fully processed image or image data 16 may be stored in memory or output to the monitor 20, the printer 22, or another device. The order of the processing may also be reversed or the origin used to begin the processing may be moved to another point on the image. For a color image, a similar process would be followed for each of the RGB color channels or the luminance channel.

Figure 4:
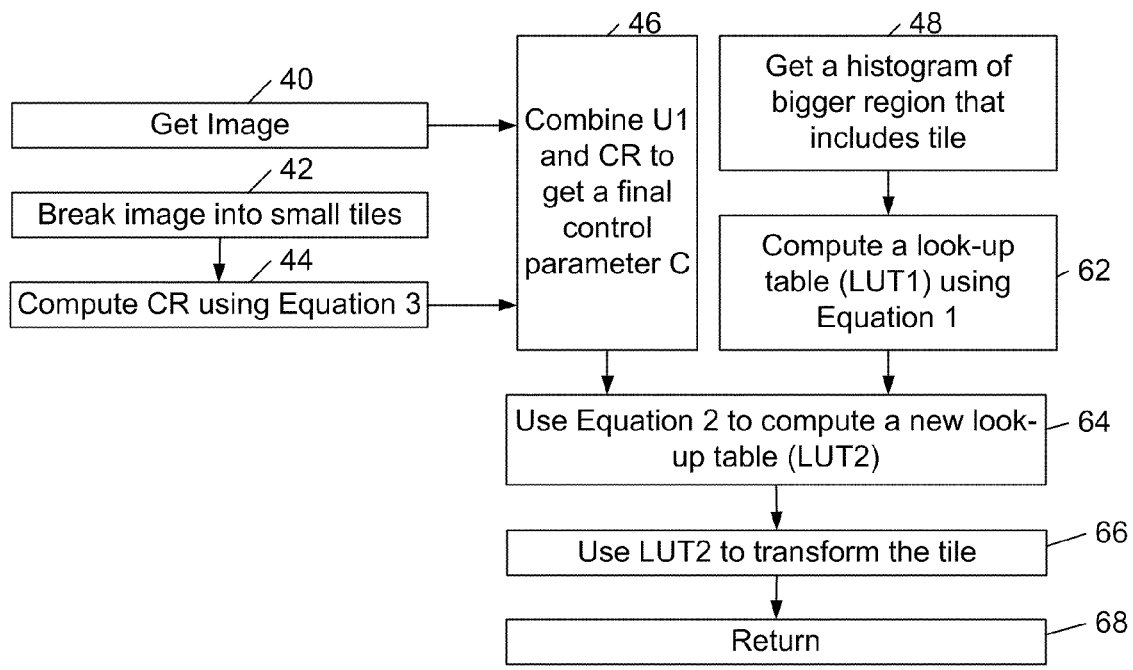
FIG. 4 is another flow chart illustrating details for a portion of the process illustrated in FIG. 3.
Figure 5:
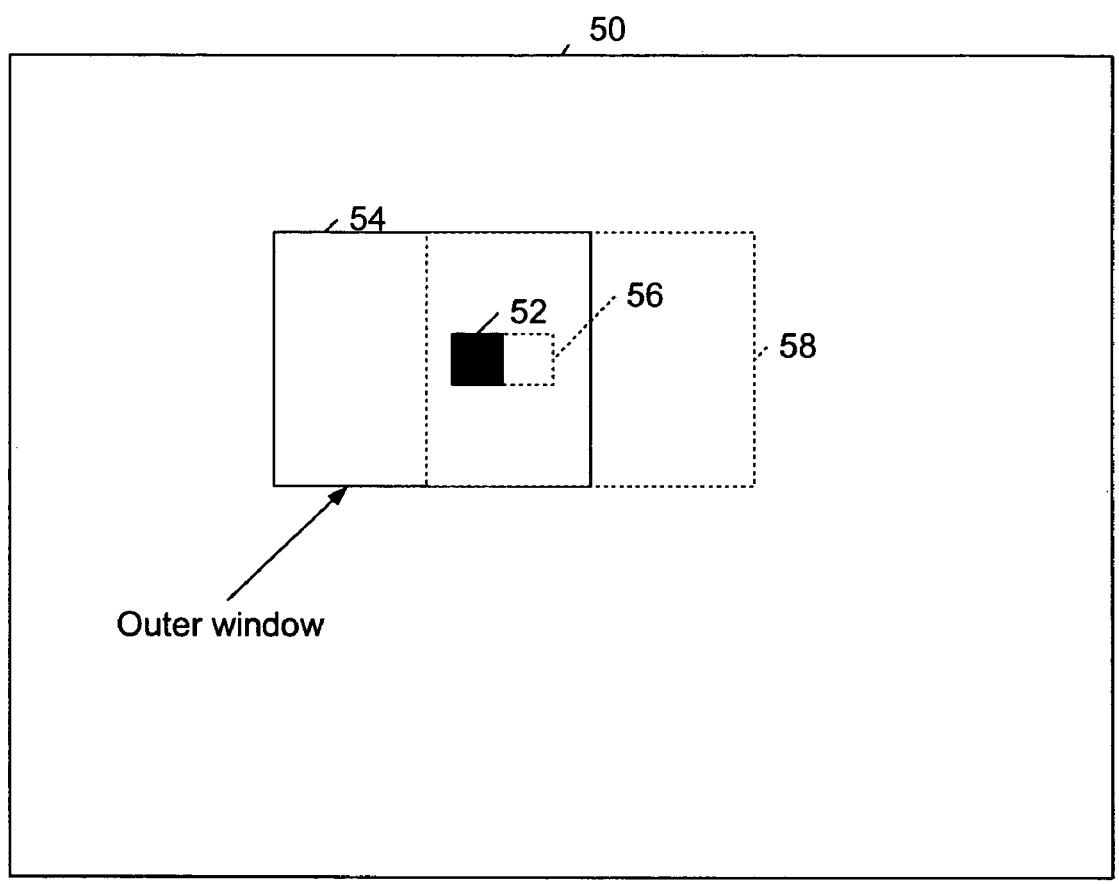
FIG. 5 is an illustration of shifting tiles and windows in an image.

FIGS. 4 and 5 provide additional details regarding the processing step 29. As shown in FIG. 4, in some embodiments, the processing step 29 includes fetching or otherwise acquiring the UI (for example, by retrieving the same from memory or from querying a user to input the same) as shown at step 40. Next, a histogram of the tile is generated as shown at step 42. Histograms may be generated using a variety of known techniques. An exemplary technique is illustrated in the pseudo code described below, where exemplary image data is again assumed to be provided in the form of a two dimensional array such as "imageData [width][height]."

```
Int hist[256];    //A single dimension array that contains the population
                  //of each gray value. For example, if hist[5] = 200 then
                  //there are 200 pixels of gray at value 5.
Int level;        //An intermediate variable that keeps the gray value of
                  //the current pixel.
```

-continued

```
For(I=0; J<256; 1++)    //For all levels assign an initial population of
                       //zero. This is called histogram initialization.
                       // Increment through each level as the image is
                       //scanned.
{
    hist[I] = 0
}
For(x=0; x<300; x++)        //Scan the image along its width.
{
    For(y=0; y<200; y++)        //Scan the image along its height.
    {
        level = imageData[x][y];    //Gray value of current pixel.
        hist[level] = hist[level]+1;    //Increment the population.
    }
}
```

After the above loop ends, the histogram is complete. If implemented properly, the total number of histogram values should be the same as the total population or image size (i.e. for this example, 200*300=60000). Again, histograms for each of the RGB color channels or the luminance channel may be generated when processing a color image.

After the histogram for the tile is determined, the CR for the tile is determined at step 44. In some embodiments, the CR is determined using Equation 3 and the scaling described above. Other ways of determining a CR are described below. The UI parameter and CR may be used to generate a final control parameter as shown at step 46.

As shown in step 48, in some embodiments the processor 14 can also determine a histogram of a larger region of image data that includes the tile being processed. This can be best understood by reference to FIG. 5.

FIG. 5 includes a representation of image data 50 that includes a first tile 52 and a first outer window 54. A histogram equalization look-up table for the first outer window 54 is generated, but applied to the first tile 52. The tile and outer window are shifted (as shown in phantom by a second tile 56 and a second outer window 58), and the process is repeated. (Through the loop 30 shown in FIG. 3.)

On an individual-tile 52 and window 54 basis, a histogram of window 54 is determined, as shown at step 48. A first look-up table is then generated using, for example, Equation 1, as shown in step 62. Next, Equation 2 may be used to create a second look-up table, as shown in step 64. The second look-up table may then be used to transform the tile (for example, tile 52), as shown at step 66. The processing of a single tile is then complete as shown at step 68. As noted above, the overall process continues until all tiles are processed (FIG. 3).

Figure 6A:
FIGS. 6A-6C illustrate an unprocessed color image, a color image processed using equalization, and a color image processed using controlled, moving-window equalization processing, respectively.
Figure 6B:
Figure 6C:

FIGS. 6A-6C illustrate the effects that application on an embodiment of the invention may have on an underexposed color image 100 (FIG. 6A). FIG. 6B illustrates a modified version of the color image 100, image 102. Image 102 was generated using a moving-window, AHE technique. FIG. 6C illustrates another modified version of the color image 100, image 104. Image 104 was produced using a controlled, moving-window, AHE implementation of an embodiment of the invention. As can be seen, in color image 100 a group of people 110 is obstructed by a shadow 112 in the image. In image 102, the group of people 110 is visible, but equalization has increased the graininess of the image 102 to a point where the image loses a life-like appearance or authentic aesthetics. In some ways, the image 102 looks like the product of animation rather than an accurate representation of an actual event captured authentically by a camera. In the image 104, the obstruction of the group of people 110 by the shadow 112 is reduced, but the image does not exhibit excessive graininess and maintains an appearance of authenticity.

Figure 7:
FIG. 7 illustrates an exemplary gray scale photograph.
Figure 8:
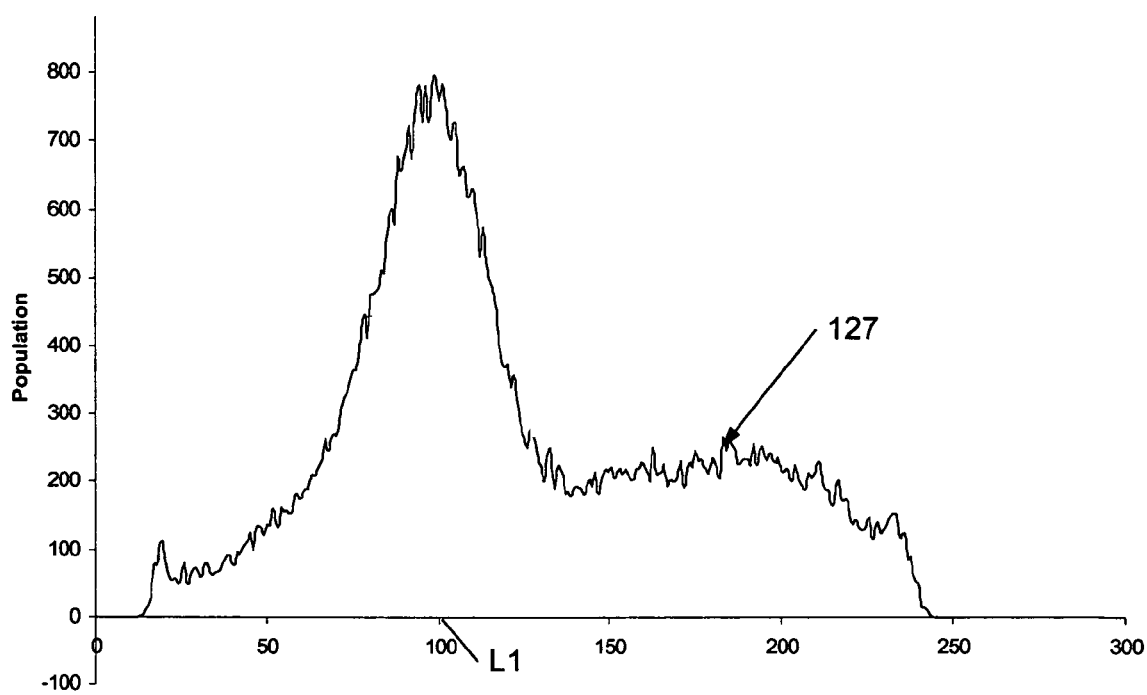
FIG. 8 is a histogram of the photograph in FIG. 7.
Figure 9:
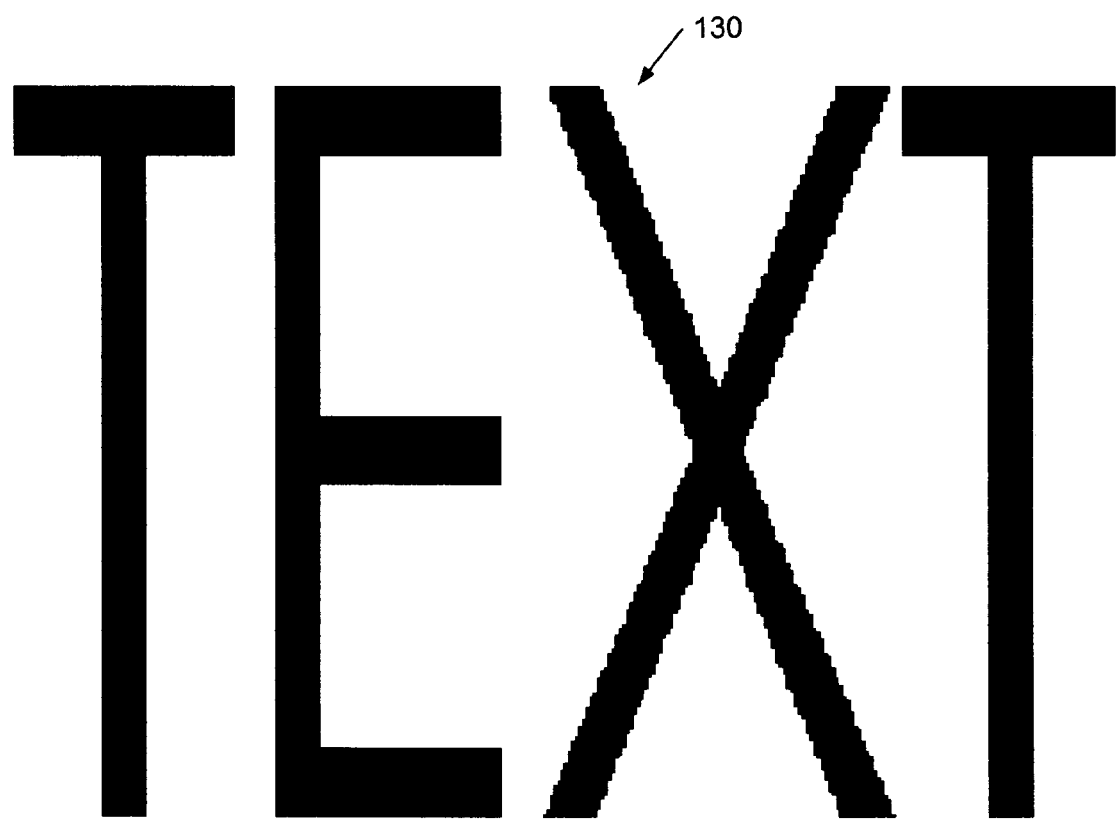
FIG. 9 is an illustration of a text-only image.
Figure 10:
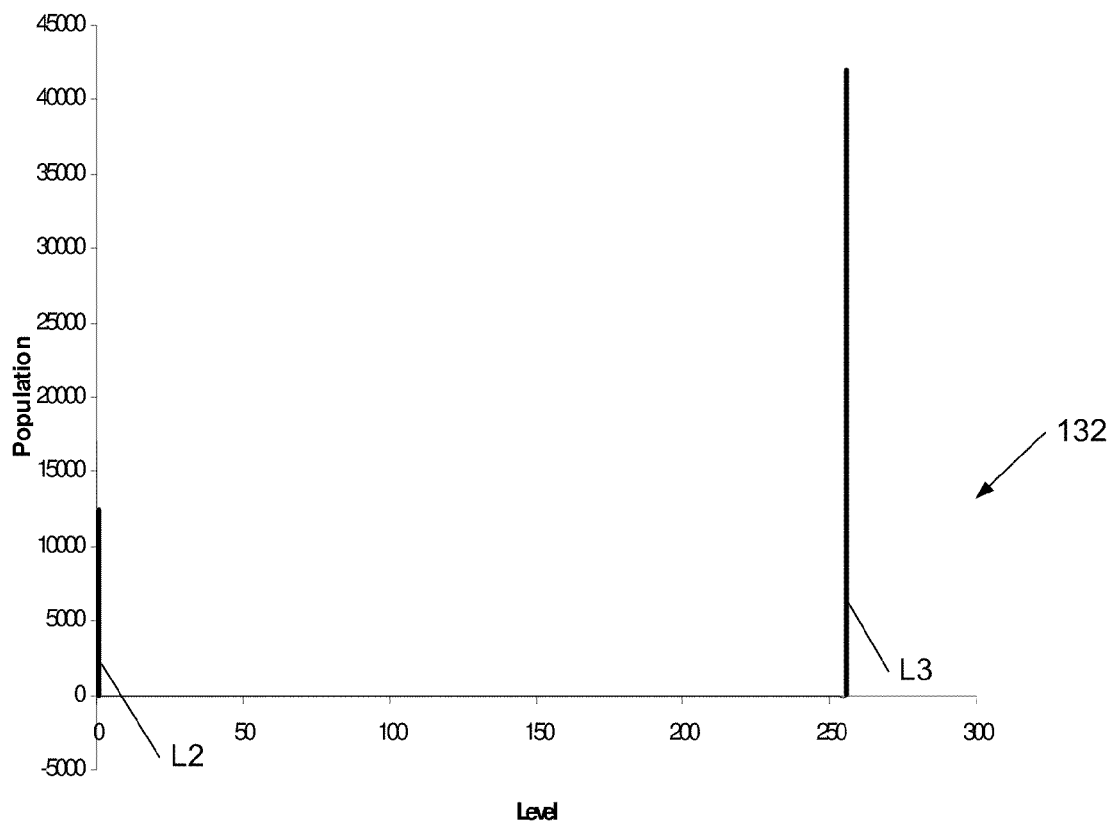
FIG. 10 is a histogram of the image in FIG. 9.

As discussed above, a histogram of a gray scale image generally represents the population of each gray level in the image. Although a histogram does not, in general, provide spatial information, it may still reveal many image features. For example, a typical text-only image has only two levels 0 (black) and 255 (white). As a consequence, the histogram for such an image will have only two levels populated. On the other hand, a typical photograph will have many and usually most of the levels populated. FIG. 7 illustrates an exemplary gray scale photograph 125 and FIG. 8 illustrates a histogram 127 for the photograph. As can be seen, the histogram 127 is populated at numerous levels with a higher concentration at a level L1 (100 on the scale on the x-axis). FIG. 9 illustrates a text only image 130. A histogram 132 for the text only image 130 is shown in FIG. 10. This histogram 132 is populated at a two levels, L2 (0 on the scale of the x axis) and level L3 (255 on the scale on the x-axis).

It would seem, particularly based on the information in FIGS. 8 and 10, that distinguishing between photographic and text images would only require counting the number of levels that are populated in a histogram. For example, it might be assumed that if only two levels are populated, then the image being classified is a text image. However, this simple method does not work in many instances. In some cases, a text image may not have exactly two levels. Some reasons for this include: edges of the text may have been stuffed with medium gray levels to reduce aliasing; and there may be noise or background data in the image. The inventors have discovered that the CR of an image may be used to distinguish noise from real data and to improve the accuracy of classification.

As noted above, the CR of an image may be determined using Equation 3. If the population is distributed evenly across all levels, the CR will generally be a large number. If the population is concentrated at a few levels, the CR will generally be a small number. An example illustrates this. First, assume there are 256 possible levels and the total population (or total number of pixels) in the image being analyzed is 512. Second, calculate the CR for two extreme cases. In the first case, suppose the population is evenly spread across all levels, i.e., each level has two pixels. In this case, $$CR=(2+2+2\ldots+2)^2/(2^2+2^2+2^2+\ldots+2^2)$$

$$CR=(256\times2)^2/(256\times2^2)$$

$$CR=256$$

In the second case, suppose the population is concentrated at one level, i.e., one level has 512 pixels and all other levels have no pixels. In this case, $$CR=(0+\ldots+0+512+0+\ldots+0)^2/(0^2+\ldots 0^2+512^2+0^2\ldots+0^2)$$

$$CR=(1\times512)^2/(1\times512^2)$$

$$CR=1$$

For any other population distribution for this example, the CR will generally be a number between 1 and 256. For example, if the population is distributed equally among half the levels, then the CR will be 128.

The concentration ratio is generally unaffected by noise, which can be illustrated by another example. Suppose the second case above is the ideal case and the CR was expected to be one. However, due to some error 128 pixels (out of 512) were registered at different levels. So, 128 levels are singly populated and one level has a population of 384. In this case, $$CR=(0+0+\ldots+0+1+\ldots+1+384)^2/(0^2+0^2+\ldots+0^2+1^2+\ldots+1^2+384^2)$$

$$CR=(128\times1+1\times384)^2/(128+384^2)$$

$$CR=1.78$$

This value is still very close to one, especially considering the possible range for the CR (1-256) and the amount of noise that was added.

CR is also substantially invariant with respect to the location of the concentration. For example, it generally does not matter whether the population is concentrated at level 254 or at level 253, the CR will remain same. This characteristic can be useful in some circumstances, particularly when the number of levels populated is more important than their locations.

In the examples above, the CR was discussed using numerical examples. However, the numbers should not be taken too literally, as they will change under different circumstances. For example, if the possible number of levels is not 256 then the range for the CR will not be 1-256. In addition, if the image is colored then the luminance channel is typically used to distinguish between text, graphic, and photographic images. (The color or gray scale identification can be made using a variety of known techniques including analyzing header information that may be available in an image file, such as a JPEG file.) Furthermore, the exponents in Equation 3 are only exemplary ones. They can be replaced by any number that is more than one and still provide useful information. For example, the following equation can be used.

$$CR = \left(\sum_L P_L\right)^4 / \left(\sum_L P_L^4\right) \quad \text{(Equation 4)}$$

Regardless of the exact technique used to determine the CR of an image, once the CR is found, it may be used to classify an image or portions thereof. For example, the CR may be compared with different thresholds for classification as shown below.

If (CR<T) Image Type=Text (Equation 5)

If (T≦CR<P) Image Type =Graphic (Equation 6)

If (P≦CR) Image Type =Photographic (Equation 7)

The thresholds in Equations 5, 6, and 7 (T and P) may be determined through a training process. For example, the CR of numerous images (e.g., 100's of images with known classifications of text, graphic, or photographic) may be generated, for example by using an image processing system that implements Equation 3 or 4 in an automated fashion (for example, in software). Then the CRs may be analyzed to determine the general range of CR values for the different classes of the analyzed images. With a sufficiently representative sample set of images, the results may be applied to other, unprocessed images of unknown classification. Refinement of the image thresholds may be made by using multiple samples and/or larger sample sets.

Figure 11:
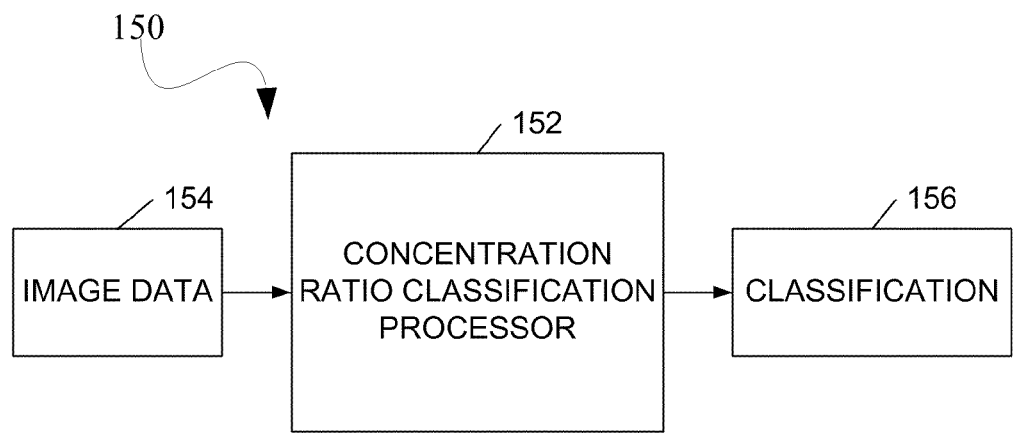
FIG. 11 is an illustration of a classification processor.

FIG. 11 illustrates an image classification system 150. The system 150 includes a classification processor 152 that receives image data 154 (such as a photographic, graphic, or text image). The classification processor performs processing (that will be described in greater detail) and produces a classification value or output 156. The classification processor 152 may be implemented using the same hardware illustrated in FIG. 2 and as described with respect to the image processor 14.

Figure 12:
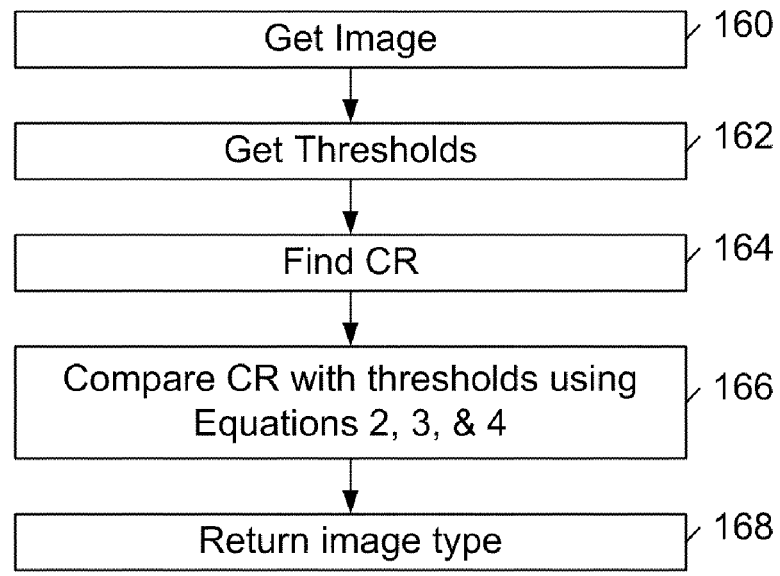
FIG. 12 is a flowchart illustrating a process for determining an image classification.

FIG. 12 illustrates a processing procedure that may be implemented by the classification processor 152. The processor 152 may first retrieve an image (for example from memory or from an image capture device such as a scanner or digital camera), as shown at step 160. Once the image has been obtained, the classification processor retrieves one or more classification thresholds (such as the thresholds T and P, which may, for example, be stored in memory) at step 162. Once the desired thresholds are obtained, the classification processor 152 determines the CR (at step 164) for the image obtained at step 160. At step 166, the classification processor 166 compares the CR to the one or more thresholds of interest. At step 168, an image type is returned. In general, it is preferable that use of the three thresholds discussed be implemented, but one, two, three, or more thresholds could be used depending on the level of classification needed. For example, if it is desired to know only whether an image is a text image or not, than only a single threshold is needed. Likewise, if it is desired to classify images into four classes, for example, text, graphic, photographic night, and photographic day, three thresholds may be determined using the training procedure noted above and applied in the classification processor 152.

Figure 13:
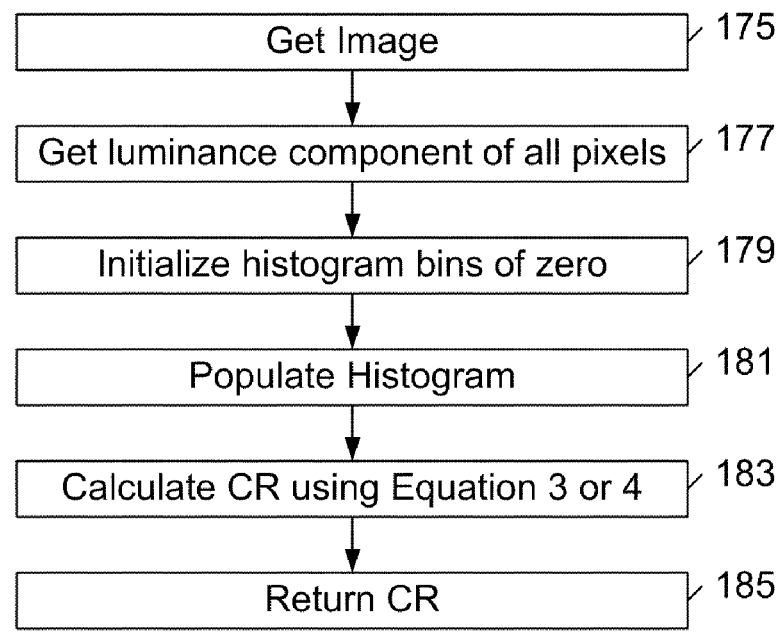
FIG. 13 is a flow chart illustrating additional details of a portion of the process shown in FIG. 12.

The process of determining the CR for an image being analyzed in the process outlined in FIG. 12 is shown in additional detail in FIG. 13. As shown at step 175, the image of interest is processed. First, the luminance or gray scale components of the pixels are determined, as shown at step 177. Then, the histogram, or more specifically, the histogram bins are initialized to zero, as shown at step 179. Next, the histogram is populated (step 181). Steps 177, 179, and 181 may be implemented using known histogram tools and techniques, including the ones discussed above. Once the histogram is determined, the CR for the image may be determined using Equation 3 or 4, including the possible variants thereof as discussed herein (step 183). Finally, in the embodiment shown, at step 185 the CR may be returned to the main process illustrated in FIG. 12. As should be apparent, the processes shown in FIGS. 12 and 13 could be implemented in a variety of procedural languages using functions and procedures and parameter passing. Object-oriented techniques could also be used, implementing the processes in FIGS. 12 and 13 as one or more methods.

One advantage of image classification performed using embodiments of the invention is that no manual intervention is required. In other words, the system may be automated. In addition, due to its computational simplicity, embodiments can be implemented in stand-alone devices that use ASICs. For example, an ASIC could be designed from a software prototype using hardware descriptor language. In addition, embodiments could also be implemented using programmable logic arrays. (These comments also apply to the processor 14.) The relative computational simplicity of embodiments of the classification processor 152 also makes those embodiments relatively fast (relatively few instructions must be executed). Thus, embodiments of the invention could be implemented as a pre-scan process in document scanners so that the final-scan can be adjusted to suit the type of image being scanned.

Figure 14:
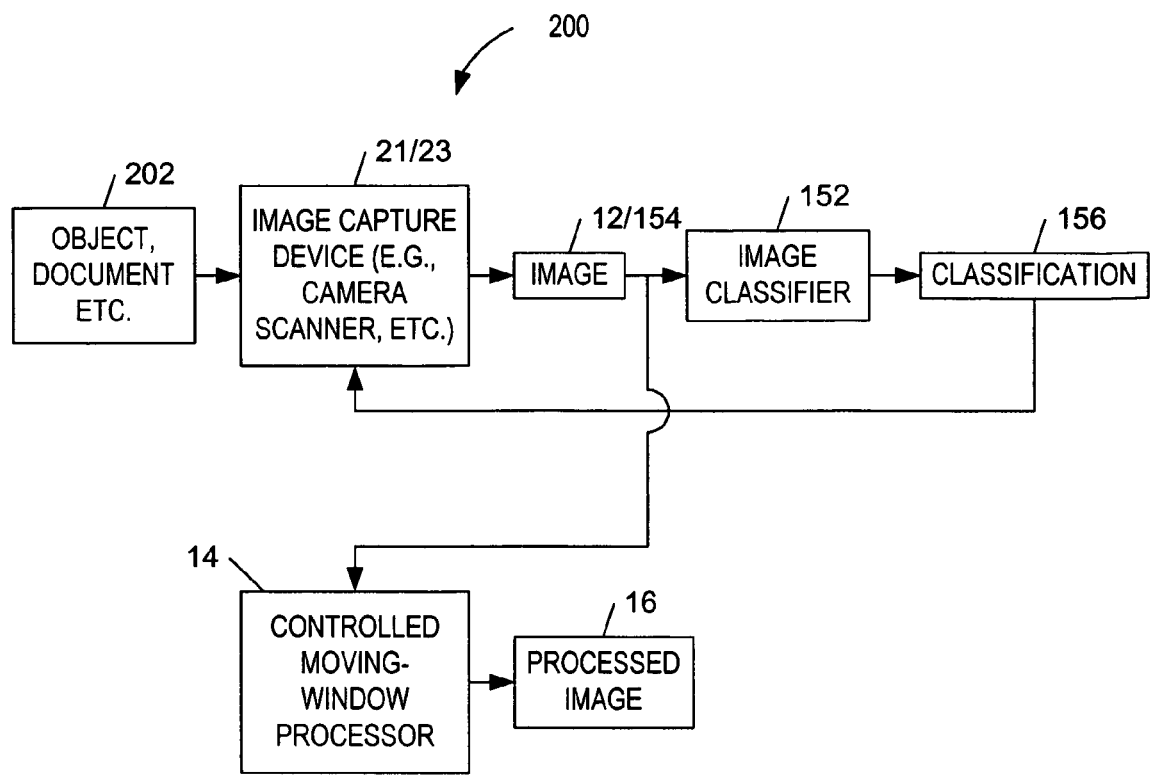
FIG. 14 is a schematic of a system that combines features of image classification and controlled equalization.

FIG. 14 illustrates a system 200 where pre-scanning or pre-imaging techniques and other features of embodiments of the invention may be combined. An object 202, such as a person, document, etc., may be imaged using an image capture device such as the camera 21 or scanner 23. The image created by the image capture device (such as the image 12 or 154) may then be delivered to the image classifier 152 for classification. The classification generated by the image classifier 152, such as classification 156, may be used as feedback to adjust the image capture device.

The image created by the image capture device whether upon a pre-imaging or upon a subsequent imaging, as modified using feedback from the image classifier 152, may be fed to the image processor 14. The image processor 14 may apply the controlled AHE discussed above to generate a processed image, such as the image 16, in order to correct exposure problems.

As should be apparent to one of ordinary skill in the art, the systems shown in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Furthermore, throughout the specification and claims reference is made to the word "image." It should be understood that the processing techniques disclosed could be applied to portions of an image and "image" incorporates whole images, partial images, or parts of an image. Thus, the claims should not be limited to whole images or to any specific hardware or software implementation or combination of software or hardware.

Various features and advantages of the invention are set forth in the following claims.

The invention claimed is:

1. A method of classifying an image, the method comprising:

obtaining an image;

determining one or more classification thresholds;

determining a concentration ratio for the image;

comparing the concentration ratio to at least one of the one or more classification thresholds; and classifying, using a processor, the image based on the comparison of the concentration ratio to at least one of the one or more classification thresholds, wherein determining the concentration ratio for the image includes determining the concentration ratio according to the following $$CR = \left(\sum_L P_L\right)^n \bigg/ \left(\sum_L P_L^n\right)$$

where CR is a concentration ratio, n is greater than 1, and $P_L$ is a population at a level L.

2. A method as claimed in claim 1 wherein n is an even integer.

3. A computer readable medium having stored thereon instructions executable by an image classifying processor to obtain an image, obtain one or more classification thresholds, determine a concentration ratio for the image, compare the concentration ratio to at least one of the one or more classification thresholds, and classify the image based on the comparison of the concentration ratio to at least one of the one or more classification thresholds, wherein the concentration ratio for the image is determined according to the following:

$$CR = \left(\sum_L P_L\right)^n / \left(\sum_L P_L^n\right)$$

where CR is a concentration ratio, n is greater than 1, and $P_L$ is a population at a level L.

4. A method of processing an image, the method comprising:

capturing an image of an object;
   classifying the image in a class using a concentration ratio;
   using the class to modify the operation of an image capturing device; and
   applying, using a processor, controlled, equalization to an image generated by the image capture device, where the controlled, histogram equalization uses a concentration ratio that indicates a relative level of smoothness of a distribution of a population of elements in the image,
wherein the concentration ratio is determined according to the following:

$$CR = \left(\sum_L P_L\right)^n / \left(\sum_L P_L^n\right)$$

where CR is the concentration ratio, n is greater than 1, and $P_L$ is a population at a level L.

5. An image processing system comprising:
   an image capture device;
   an image classifier coupled to the image capture device in a feedback loop; and
   a controlled, equalization processor coupled to the image capture device, that uses a concentration ratio that indicates a relative level of smoothness of a distribution of a population of elements in the image, wherein the processor is configured to determine the concentration ratio for the image according to the following:

$$CR = \left(\sum_L P_L\right)^n / \left(\sum_L P_L^n\right)$$

where CR is the concentration ratio, n is greater than 1, and $P_L$ is a population at a level L.

6. An image processing system comprising:
   an image capture device configured to capture an image; and
   an image classifier coupled to the image capture device in a feedback loop, the image classifier configured to determine a concentration ratio for the image that indicates a relative level of smoothness of a distribution of a population of elements in the image, compare the concentration ratio to at least one or more classification thresholds, and classify the image based on the comparison of the concentration ratio to at least one of the one or more classification thresholds, wherein the image classifier is configured to determine the concentration ratio for the image according to the following:

$$CR = \left(\sum_L P_L\right)^n / \left(\sum_L P_L^n\right)$$

where CR is the concentration ratio, n is greater than 1, and $P_L$ is a population at a level L.

* * * * *